United States Patent Office 3,405,818
Patented Oct. 15, 1968

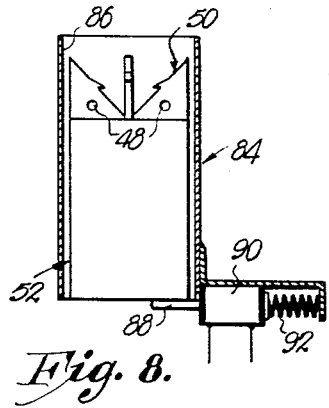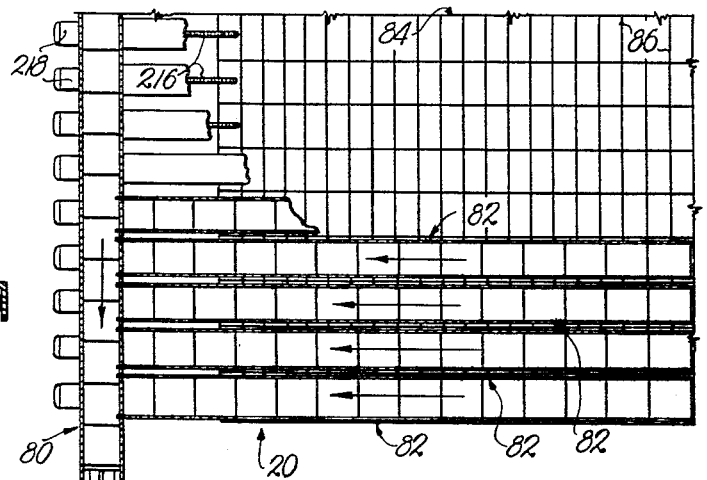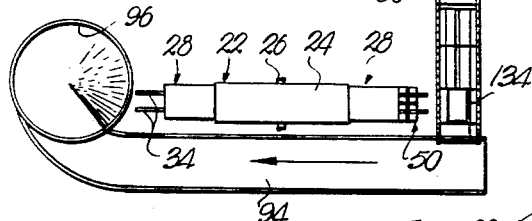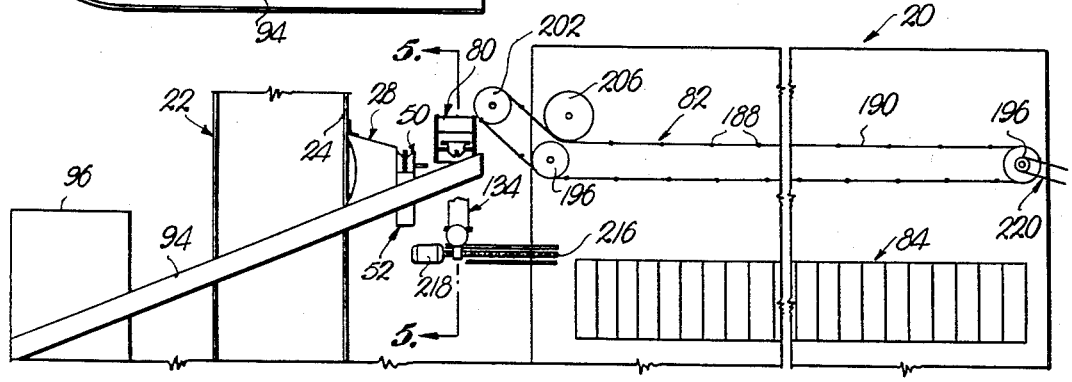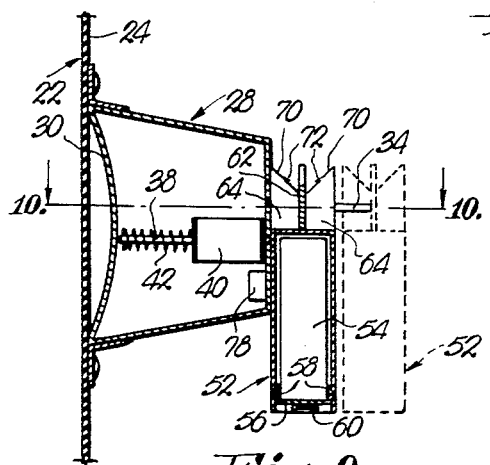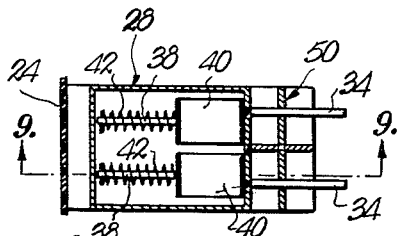

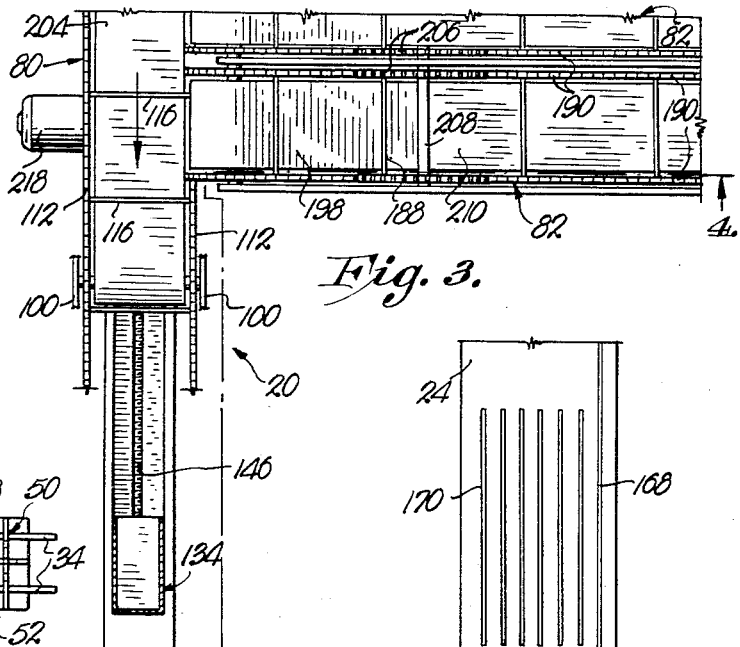

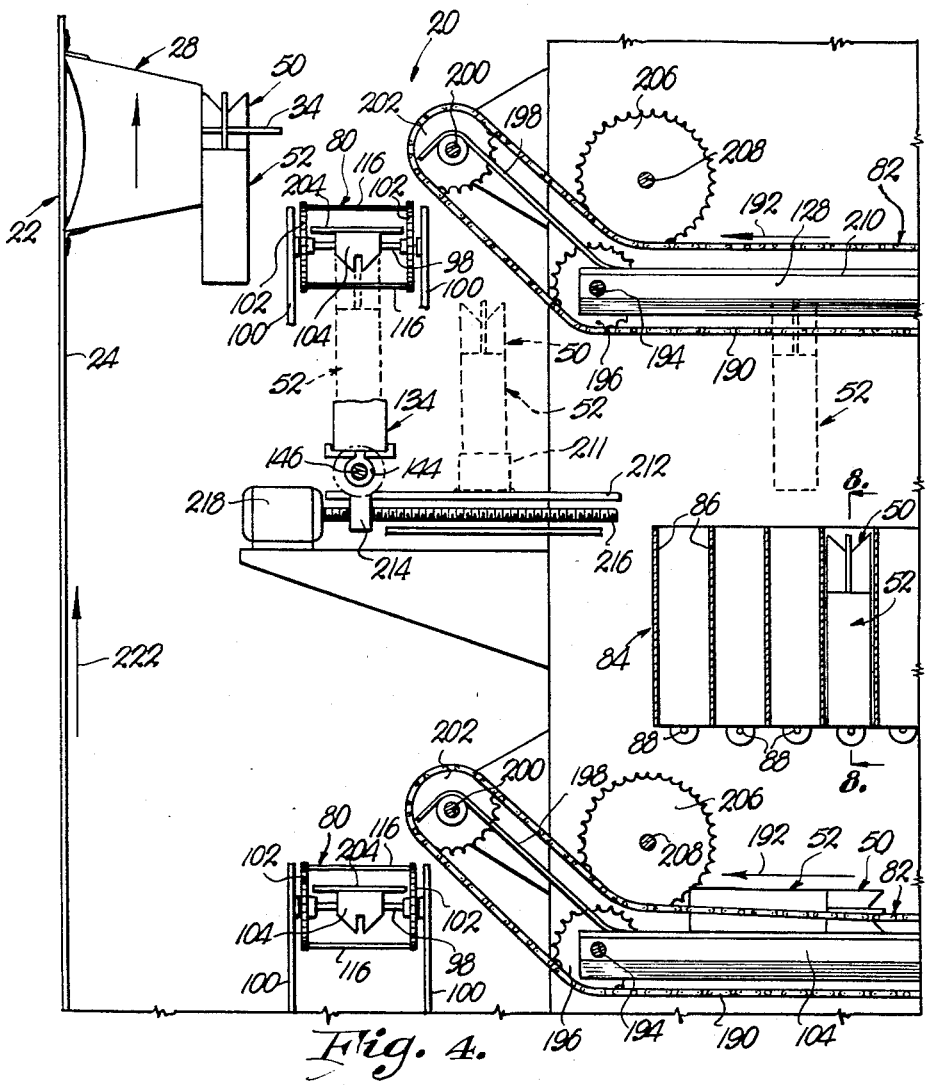
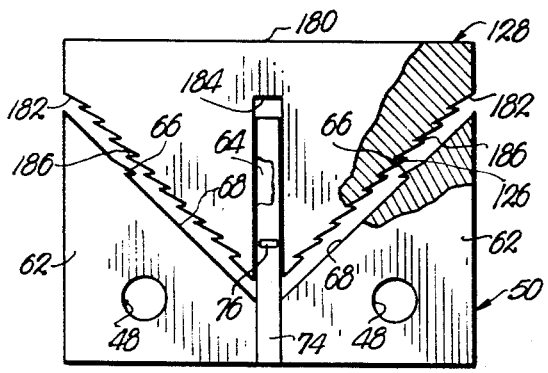
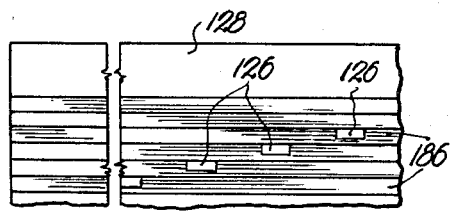

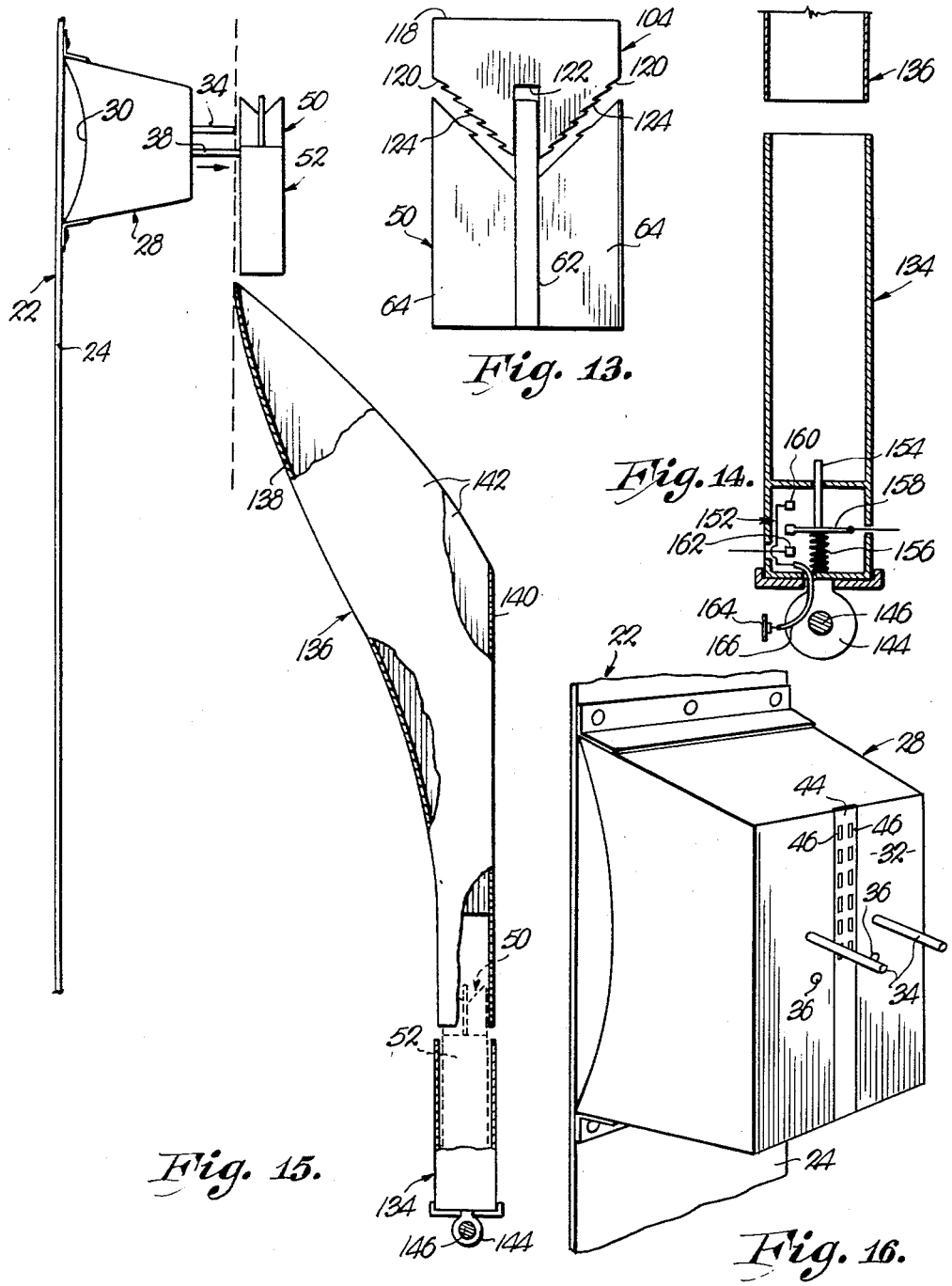

3,405,818
ARTICLE STORAGE AND RETRIEVAL SYSTEM
Stan Humenuk, Lawrence, Kans.
(317 Elmwood Drive, Champaign, Ill. 61820)
Filed Jan. 4, 1965, Ser. No. 422,914
14 Claims. (Cl. 214—16.4)

ABSTRACT OF THE DISCLOSURE

A system and apparatus for conveying, storing and retrieving articles including a vertical conveyor belt having pin means for releasably securing an article container thereto to move the container into a position adjacent a second conveyor. Solenoid means carried by the vertical conveyor discharges the container into a position where the container is advanced to the second conveyor for movement toward a plurality of receptacles at a storage unit. Indexing means including a longitudinal beam having a plurality of grooves therein adapted to cooperate with matrix means including projections engageable with the grooves support the container until the latter reaches a particular discontinuity in the grooves whereupon the container is released from the conveyor. Secondary conveyors, also provided with indexing means, guide the container to its predetermined location in the storage unit. Latch means operable from a control center initiates retrieval of the article whereupon the article is returned to a predetermined location by said conveyors.

---

This invention relates to the handling of articles and, more particularly, to apparatus and a method for storing and retrieving articles, such as books or the like.

Present techniques used by libraries for storing and retrieving books have proven satisfactory in the past but, in view of the increasing number of books which are shelved in libraries, the retrieving and shelving of the books has become a problem from the standpoint of the time involved in accomplishing these steps. Some libraries require that an assitsant do the actual shelving and retrieving of the books, thus prohibiting book-borrowers from having direct access to the books or to the stacks in which the books are disposed. Other libraries permit a patron to go directly to the stacks and find his desired book. However, it is oftentimes difficult for a person who is unfamiliar with a library to find a particular book without spending a considerate amount of time or without receiving assistance from a librarian. Studies have shown that the research scholar's time is limited and the older he becomes the less he is interested in spending his time on irrelevancies, such as seeking the desired research materials, that stand between him and his immediate goals. As libraries become larger from year to year, more and more obstacles are presented to the research scholar in accomplishing the purpose of his studies.

The present invention minimizes the problems inherent in present-day libraries by providing apparatus and a method for automatically shelving and retrieving a relatively large number of books which are stacked remotely from a control station at which the books are sent to and received from their stored positions. Thus, the concepts of the present invention are especially suitable for use in automating full-scale libraries having volumes numbering in the millions, all to the end that the space required to house the books is minimized and the personnel required to operate a library utilizing the invention would be significantly reduced whereby to increase the efficiency of the library and to render the operation thereof extremely more economical than that of present day libraries.

It is, therefore, the primary object of the instant invention to provide apparatus and a method for automatically shelving and retrieving a relatively large number of books, whereby the apparatus and method may be adapted for automating the operation of a full-scale library to minimize or completely eliminate the problems which now exist with respect to the operation of such a library.

Another object of this invention is to provide apparatus and a method of the aforesaid character which can be utilized for handling articles of different types and sizes capable of being moved into and out of respective individual locations in side-by-side relationship whereby the time required to store and retrieve the articles is minimized and the storing and retrieving steps can be accomplished by a single indivdual located at a control station spaced remotely from the locations at which the articles are stored.

Yet a further object of the present invention is the provision of a storage and retrieval system for library books which may be comprised of a relatively large number of vertically spaced tiers, as well as a plurality of range rows for each tier whereby an extremely large number of books may be conveniently shelved at specific locations in the range rows of each of the tiers to the end that the volumes of an entire full-scale library can be shelved in a minimum amount of space and can be retrieved in a minimum amount of time.

Another object of this invention is the provision of a storage and retrieval system of the aforesaid character which is economical in operation, relieves librarians for other duties, prevents pilfering of library books and requires only a minimum of maintenance by virtue of its relatively simple, but rugged construction throughout.

A further object of the instant invention is the provision of a system of the type described wherein each book of a library travels to and from its own individual storage location automatically without handling by personnel other than to place the book in condition for movement to its location and to remotely initiate the movement thereof from such location.

Other objects of this invenion will become apparent as the following specification progresses, reference being had to the accompanying drawings, wherein:

FIGURE 1 is a top plan view of a portion of the article storage and retrieval system illustrating one tier and its associated range rows above article-receiving compartments by means of which the steps of the instant method are carried out, parts being broken away to illustrate details of construction;

FIG. 2 is a side elevational view of the structure illustrated in FIG. 1;

FIG. 3 is an enlarged, fragmentary, top plan view of conveyors which elevate an article to the tier along the latter and then laterally thereof to a specific storage location;

FIG. 4 is a cross-sectional view taken along line 4—4 of FIG. 3 and illustrating a pair of vertically spaced tiers and an associated range row of each tier respectively;

FIG. 5 is an enlarged, cross-sectional view taken along line 5—5 of FIG. 2;

FIG. 6 is an enlarged, fragmentary view of the matrix associated with each article respectively to provide identification therefor and illustrating the disposition of the matrix relative to a grooved, slotted beam forming a portion of one of the conveyors;

FIG. 7 is an enlarged, fragmentary, side elevational view of the beam shown in FIG. 6;

FIG. 8 is a cross-sectional view taken along line 8—8 of FIG. 4 and illustrating the way in which a book is releasably retained in its own individual storage location;

FIG. 9 is a cross-sectional view taken along line 9—9 of FIG. 10;

FIG. 10 is a cross-sectional view taken along line 10—10 of FIG. 9;

FIG. 11 is a cross-sectional view taken along line 11—11 of FIG. 5;

FIG. 12 is a side elevational view of a portion of one of the conveyors illustrating the face thereof on which electrically conducting strips are placed for sensing the requisite tier corresponding to the storage location of a particular article carried by the conveyor;

FIG. 13 is an end elevational view of the matrix illustrated in FIG. 6;

FIG. 14 is a cross-sectional view of a receptacle at each tier respectively for receiving the article to be stored and illustrating the actuating switch therefor to initiate movement of the article toward its storage location;

FIG. 15 is a side elevational view of one of the conveyors and a chute for a specific tier illustrating the way in which an article to be stored is moved from the last-mentioned conveyor and into the receptacle of FIG. 14 prior to movement toward the storage location of the article; and FIG. 16 is a perspective view of the carrier on the conveyor of FIG. 15 and illustrating the electrical contacts thereon which provide circuit-closing means when the matrix of FIG. 6 is disposed thereon and coupled to a container housing the article to be stored.

The present invention provides an article storage and retrieval system which comprises apparatus for elevating a container having an article to be stored therein to any one of a number of vertically spaced tiers and then along the tier to a particular one of a plurality of range rows associated with the tier, along the corresponding range row to a location above the particular storage space or compartment of the article, and then into the compartment at which it is retained until it is to be retrieved.

All of the steps of the method of the instant invention are accomplished automatically once the article and its container move upwardly toward the storage space. Independent conveyors are employed to elevate the article and its container to a specific tier, to move the same along the tier, and then to move these components laterally along the corresponding range row into a position overlying its specific storage location. Means is provided for automatically separating the container and the article therewithin from each of the aforesaid conveyors at the proper time and at the proper position whereby the container and its contents will always terminate its movement at the prescribed storage location therefor.

Several of the conveyors are utilized for retrieving a container and its article, the retriever step being accomplished automatically and controlled from a station remote from the storage location. Specifically, the conveyors of the next adjacent lower tier are employed to receive the container and to advance the same to a chute along which the container moves until it is retrieved at a circulation desk or the like. Upon removing the article from the container, the latter is permitted once again to move to its storage location and to remain there until the article is to be inserted therein once again.

Article storage and retrieval system 20 includes a first conveyor 22 having an endless, flexible belt 24 trained about a pair of vertically spaced pulleys (not shown) rotatable on vertically spaced, aligned shafts 26, only one of which is shown in FIG. 1. A number of carriers 28 are secured to the outer surface of belt 24 in the manner illustrated in FIGS. 9 and 16, there being a recess 30 on the back of each carrier 28 to permit the latter to pass over the upper pulley and below the lower pulley. The outer face 32 of each carrier 28 has a pair of fixed pins 34 extending laterally therefrom as shown in FIGS. 10 and 16.

A pair of spaced openings 36 in carrier 28 (FIG. 16) receive pushrods 38 normally disposed within carrier 28 and extending through the centers of tubular solenoids 40 (FIG. 10). Rods 38 are of magnetically susceptible material and define the cores of solenoids 40 whereby, upon actuation of solenoids 40, rods 38 move through openings 36 and outwardly of carrier 28. Springs 42 retract rods 38 into carrier 28 when solenoids 40 are de-energized.

A strip 44 of electrically nonconducting material is provided on face 32 between pins 34 and openings 36 as shown in FIG. 16. A pair of spaced, electrical contacts 46 are disposed on strip 44 at each of a number of longitudinally spaced locations thereon. Contacts 46 are electrically coupled with solenoids 40 in a manner hereinafter described for actuating the latter and causing rods 38 to project outwardly from carrier 28 when contacts 46 are bridged and form a part of a closed electrical circuit.

Pins 34 are adapted to be received within a pair of openings 48 in a matrix or indexing member 50 secured to the normally uppermost extremity of a hollow article containing 52 as shown in FIGS. 8 and 9. Conveyor 22, matrix 50 and conveyors hereinafter described have indexing means thereon for effecting the separation of matrix 50 from the conveyors at the proper location with respect to the space in which the matrix and its container 52 are to be stored. Container 52 releasably retains an article 54 to be stored. A removable closure 56 on container 52 permits insertion and removal of article 54. Closure 56 has a pair of spring-biased sides 58 which frictionally engage the inner surfaces of container 52. A retractable handle 60 facilitates the removal of closure 56 from blocking the open lower end of container 52. Thus, article 54 may be readily inserted within and removed from container 52.

As shown in FIG. 9, pins 34 project outwardly from face 32 a sufficient distance to support container 52 and article 54 thereon during upward movement of carrier 28 under the influence of belt 24. The upper extremity of container 52 is above the outward path of travel of rods 38 so that the latter force container 52 outwardly of carrier 28 and into the dashed-line position of FIG. 9 when solenoids 40 are energized.

Matrix 50 includes a first pair of sections 62 having openings 48 therein, and a second pair of sections 64 (FIG. 9) at right angles to sections 62. Each section 62 has a projection 66 extending outwardly from an inclined surface 68 on the corresponding section, surfaces 68 being relatively convergent as the same extend downwardly. Similarly, each section 64 has a surface 70 provided with an outwardly extending projection 72. Projections 72, like projections 66, are aligned with each other and are disposed at preselected locations along surfaces 70.

As shown in FIG. 6, one of the sections 64 has an electrically nonconducting strip 74 provided with an electrical contact 76 at a preselected location thereon. When openings 48 receive pins 34 and container 52 is in the position thereof shown in FIG. 9, contact 76 bridges contacts 46 of one of the pairs of contacts 46 illustrated in FIG. 16. Container 52 is preferably of a magnetically susceptible material so that a magnet 78, carried within carrier 28 (FIG. 9), will releasably maintain container 52 as closely as possible to face 32 and thereby maintain the corresponding contact 76 in bridging relationship to the adjacent pair of contacts 46.

As shown in FIG. 4, belt 24 moves each carrier 28 and the container 52 carried thereby, upwardly past a number of second vertically spaced, horizontally disposed conveyors 80, one of which is shown in FIG. 1. Each conveyor 80 has associated therewith a plurality of third, horizontally disposed conveyors 82 extending laterally therefrom at right angles and overlying a storage unit 84 comprised of a pluraltiy of compartments 86, each adapted to receive and retain a corresponding container 52. Each unit 84 overlies the third conveyors 82 of the next lower second conveyor 80 in the manner illustrated in FIG. 4. Releasable means such as a pin 88 is provided for each compartment 86 respectively to releasably retain container 52 within the corresponding compartment, as shown in FIG. 8. Pin 88 may form the core of a tubular solenoid 90 carried in any suitable manner on unit 84 and provided with a spring 92 for biasing pin 88 into the position thereof shown in FIG. 8.

Container 52 is retrieved from its compartment 86 by energizing solenoid 90 to retract pin 88 and permit container 52 to drop onto the corresponding third conveyor 82 therebelow. The container is then advanced laterally onto the corresponding second conveyor 80 and thence at right angles to an inclined ramp 94 and then into a spiral chute 96 for delivery to a circulation desk or the like.

Each second conveyor 80 is comprised of a pair of horizontally spaced shafts 98, only one of which is shown in FIGS. 3 and 5, shafts 98 being journalled in a pair of spaced supports 100 for rotation about horizontal, parallel axes. Each shaft 98 has a pair of spaced sprockets 102 thereon, the sprockets 102 of one shaft 98 being aligned with corresponding sprockets 102 of the other shaft 98. A beam 104 spans the distance between shafts 98 in the manner illustrated in FIG. 5 and has a plate 106 extending outwardly from one end thereof. A shaft 108, having a pair of sprockets 110 secured thereto, is journalled for rotation about a horizontal axis at the outer end of plate 106, as shown in FIG. 5.

A pair of endless, flexible chains 112 are coupled with sprockets 102 and 110 and move in the direction of arrows 114 (FIG. 5) when one of the shafts 98 is rotated in a counterclockwise sense when viewing FIG. 5. A plurality of spaced cross-bars 116 are secured to and span the distance between chains 112 in the manner shown in FIG. 4.

As shown in FIG. 13, beam 104 has a substantially flat top surface 118 and a pair of sloping side surfaces 120 which converge as the lowermost extremity of beam 104 is approached. A slot 122 extends throughout the length of beam 104 and projects inwardly from the lower edges of surfaces 120. Each surface 120 is provided with a plurality of grooves 124, the lower portion of each of which provides a support for a corresponding projection 72 on a matrix 50, the grooves 124 of surfaces 120 being aligned with each other. As matrix 50 moves toward beam 104 projections 72 move into aligned grooves 124 and are supported by the lower portions of the structure forming grooves 124 as projections 72 slide along such portions longitudinally of beam 104. Matrix 50 is separated from beam 104 by providing discontinuities or voids at specific, preselected locations along the lengths of grooves 124 whereby projections 72 are no longer supported by the lower portions of corresponding grooves 124. As a result, matrix 50 and the container 52 associated therewith, gravitate from beam 104. Discontinuities of the type described are illustrated in FIG. 7 wherein the discontinuities 126 associated with a beam 128 of a third conveyor 82 are staggered with respect to each other. tI is conceivable, to increase the operating range of system 20, to provide each section 64 of matrix 50 with two or more projections 72 and to provide beam 104 with two or more discontinuities in groove 124, whereby, when the projections 72 become aligned with the discontinuities, the corresponding matrix 50 will no longer be supported by beam 104 and thereby will gravitate therefrom.

The upper extremity of plate 106 is above and to the side of the upper end of the corresponding ramp 94 as shown in FIGS. 1 and 5. A container 52 moving in the direction of arrow 114 on the upper surface 118 of beam 104 under the influence of crossbars 116, will move onto and along plate 106 and then will be forced onto ramp 94 for sliding movement along the same and into chute 96. To retain chains 112 in coupled relationship to sprockets 102 at the end of beam 104 adjacent to ramp 94, a pair of rollers 130, secured to a stub shaft 132, are provided above sprockets 102 as illustrated in FIG. 5.

To move matrix 50 into coupled relationship with beam 104, a receptacle 134, having an open top and an open end, is adapted to receive container 52 after matrix 50 has been removed from pins 34 upon movement of rods 38 outwardly of carrier 28. A chute 136 having an arcuate back 138, a flat front 140, and a pair of sides 142, is positioned to receive the container 52 and direct the same into the open, upper end of receptacle 134 as shown in FIG. 15. Chute 136, therefore, extends upwardly from the corresponding second conveyor 80, the latter being located at a particular tier above the circulation desk or control station to which the containers 52 are directed and from which container 52 is dispersed.

Receptacle 134 is provided with a boss 144 which is threadably mounted on a screw 146 coupled to a reversible motor 148 disposed on a support 150. As shown in FIG. 3, screw 146 is aligned with the corresponding beam 104 so that rotation of screw 146 in one direction will cause receptacle 134 to move container 52 into the intermediate dashed-line position of FIG. 5 at which projections 72 on sections 64 will become coupled with corresponding grooves 124 of beam 104. Crossbars 116, synchronized with the rotation of screw 146, will then engage matrix 50 and urge the latter, and thereby container 52, along beam 104 until projections 72 become aligned with discontinuities in grooves 124. As shown in dashed lines in FIG. 5, matrix 50 and the corresponding container 52 are supported intermediate the ends of beam 104. After matrix 50 has become coupled with beam 104, motor 148 reverses and retracts receptacle 134 so as to position the same once again in alignment with the lower open end of chute 136 shown in FIGS. 14 and 15.

Receptacle 134 has an electrical switch 152 in the bottom thereof which is actuated by a plunger 154 extending upwardly into the interior thereof as shown in FIG. 14. A spring 156 biases arm 158 upwardly and into engagement with an electrical contact 160 spaced from an electrical contact 162, contacts 160 and 162 forming parts of switch 152.

A bar 164, shown in FIGS. 5 and 14, extends longitudinally of screw 146 and is slidably engaged by the outer end of a follower 166 coupled electrically to contact 160. When container 52 is disposed within receptacle 134, plunger 154 is deflected downwardly and arm 158 engages contact 162. One side of switch 152 is thus closed and motor 148, coupled with a source of electrical power and with switch 152, is energized to advance receptacle 134 toward the corresponding beam 104. Receptacle 134 will continue to move until container 52 moves out of the open end thereof under the influence of one of the crossbars 116. To accomplish this, crossbars 116 will be moving at a slightly greater linear speed than receptacle 134. Switch 152 will then open and arm 158 will move into engagement with contact 160, causing motor 148 to reverse, it being clear that bar 164 and arm 158 are coupled to motor 148 and a suitable source of electrical power to effect the reversal of motor 148. As receptacle 134 returns to its initial position illustrated in FIG. 5, follower 166 will move out of engagement with bar 164, thus breaking the electrical circuit to motor 148 so as to de-energize the same. Receptacle 134 is then ready to receive another container 52 through the open top thereof.

To energize solenoids 40 and thereby separate container 52 from carrier 28, belt 24 is provided with a first flexible, continuous, electrically conducting strip 168 affixed to the inner surface of belt 24 along one edge thereof as shown in FIG. 12. Belt 24 is also provided with a number of shorter strips 170 identical in construction to strip 168, there being a set of strips 170 adjacent to each carrier 28 respectively.

Strips 170 are parallel to each other and there is provided a strip 170 for each pair of contacts 46 respectively on strip 44. As shown in FIG. 3, a pair of brushes 172 and 174 are carried by a support 176 adjacent to the path of travel of belt 24 and engage the inner surface of belt 24 at all times. Brush 172 is aligned with and engages strip 168, whereas brush 174 is aligned with and engages a strip 170 corresponding to a particular tier defined by a specific second conveyor 80. Contacts 46 and brushes 172 and 174 are coupled with solenoids 40 and a suitable source of electrical power so that, when contact 76 on matrix 50 bridges the proper pair of contacts 46 and as brush 174 moves into engagement with the proper strip 170, solenoids 140 will be energized and rods 38 will be forced outwardly of carrier 28 against container 52 to move the latter into the dashed-line position of FIG. 9, permitting gravitation thereof into chute 136. As brush 174 moves out of engagement with the strips 170, the circuit to solenoids 40 is opened, thus permitting springs 42 to retract rods 38 into carrier 28.

Each third conveyor 82 is similar to its corresponding second conveyor 80 inasmuch as it includes a beam 128 provided with a substantially flat top surface 180, and a pair of sloping side surfaces 182 which converge toward each other and terminate at a slot 184 as shown in FIG. 6. Surfaces 182 are provided with a plurality of longitudinally extending grooves 186, each provided with one or more discontinuities 126 in the manner described above with respect to beam 104. Projections 66 on matrix 50 are disposed to be supported by the lower portions of corresponding grooves 186 in beam 128 so that container 52 will be supported as it moves along the beam under the influence of crossbars 188 carried by a pair of endless, flexible chains 190 mounted for movement in the direction of arrow 192, as shown in FIG. 4.

Each beam 128 is supported at the ends thereof by shafts 194, only one of which is shown in FIG. 4, shafts 194 being journalled for rotation by supports similar in all respects to supports 100. A pair of sprockets 196 are secured to each shaft 194 respectively and are coupled with corresponding chains 190.

An inclined plate 198 extends upwardly and outwardly from the end of beam 128 adjacent to its corresponding second conveyor 80 in the manner illustrated in FIG. 4. A shaft 200, journalled at the outer extremity of plates 198, has a pair of sprockets 202 secured thereto and coupled with chains 190. The outermost extremity of plate 198 is above and slightly to the side of a platform 204 rigid to the upper surface 118 of the corresponding beam 104. A pair of spur gears 206 carried by a stub shaft 208 adjacent to the junction of beam 128 and plate 109, maintains tension on chains 190 during movement of the latter relative to beam 128. Crossbars 188 move container 52 in the manner shown in FIG. 4 along a platform 210 on the upper surface 180 thereof and then upwardly along plate 198 and onto platform 204. Container 52 is then moved laterally to ramp 94 and then into chute 96.

After matrix 50 and container 52 have gravitated from a corresponding beam 104, container 52 drops into a receptacle 211 rigid to a plate 212 and having an open top and an open end similar to receptacle 134. A boss 214 rigid to plate 212 is threadably mounted on a screw 216 rotated by a reversible motor 218. As shown in FIG. 1, there is provided a motor 218 for each third conveyor 82 respectively. Suitable electrical switching mechanism, similar to that illustrated in FIG. 14, is provided to energize motor 218 and to reverse the same after matrix 50 carried thereby has been moved into coupled relationship with the corresponding beam 128.

As matrix 50, and thereby the corresponding container 52, is moved along beam 128, container 52 will move into alignment with its preselected compartment 86 therebelow in unit 84. When this alignment occurs, projections 66 will be aligned with the corresponding discontinuities 126 in grooves 186 so that container 52 will gravitate from beam 128 and into its respective compartment 86. Pin 88 of compartment 86 will prevent downward movement of container 52 outwardly of compartment 86 until solenoid 90 is energized.

For purposes of illustration, one of the shafts 194 is shown in FIG. 2 as being driven by a belt and pulley assembly 220. It is clear, however, that other means of rotating shafts 98 and 194 may be utilized.

*Operation*

To utilize system 20 for storing and retrieving a large number of articles, such as library books in a full-scale municipal or university library, each article is initially provided with a matrix 50 and an associated container 52. Matrix 50 is constructed with projections 66 and 72 so that the container will gravitate from beam 104 at the proper tier or elevation onto plate 212 therebelow and gravitate from beam 128 of the proper range row defined by the corresponding third conveyor 82 into the preselected compartment 86 directly below the range row. In this respect, it is understood that beams 104 and 128 will be provided with the proper discontinuities at the correct locations thereon so as to permit the aforesaid downward movements of container 52 as the latter is shifted along its circuitous path toward its respective compartment 86.

Each matrix must initially be provided with a contact 76 on strip 74 thereof at the proper location so as to effectively bridge a corresponding pair of contacts 46 on the carrier 28 when matrix 50 is coupled with pins 34. Assuming that it is desired to move a container 52, with or without an article 54 therewithin, upwardly from a control station such as the circulation desk of a library and into its compartment 86, first conveyor 22 is actuated so that one of the carriers moves upwardly in the direction of arrow 222 in FIG. 4 past the virtically aligned tiers defined by second conveyors 80. Matrix 50 on the container may be coupled with pins 34 by receiving the latter in openings 48. This may be accomplished as belt 24 moves upwardly if the speed of the belt is not too great. During every movement of container 52, the latter and pins 34 clear chutes 136 so that there will be no interference whatsoever in operating conveyor 22.

When the brush 174 corresponding to a given tier engages a strip 170 connected electrically to a pair of contacts 46 bridged by the contact 76 on the matrix 50 carried by carrier 28, solenoids 40 will be energized to force rods 38 outwardly of the carrier and against container 52 in the manner shown in FIG. 15. This action will occur after the carrier has moved to a location above the tier at which it is desired to position container 52. However, the corresponding chute 136 will deliver the container and its matrix into the corresponding receptacle 134 for movement horizontally toward the adjacent beam 104.

Switch 152 is actuated when container 52 forces plunger 154 downwardly, thus energizing the corresponding motor 148 and moving matrix 50 toward and into coupled relationship with the corresponding beam 104. Crossbars 116 then advance the matrix 50 until projections 72 thereof are aligned with the proper discontinuities, whereupon container 52 and matrix 50 thereof will gravitate onto plate 212 for movement toward the corresponding beam 128 of the proper range row. A switch similar to switch 152 will be energized when this occurs so that plate 212 is advanced by the rotation of screw 216 under the influence of the corresponding motor 218. Crossbars 188 will move matrix 50 along beam 128 after projections 66 have moved into coupled relationship with beam 128. When projections 66 become aligned with corresponding discontinuities 126, container 52 and its matrix 50 will gravitate from beam 128 into the proper compartment 86. Container 52 is retained within its compartment 86 by pin 88 until it is to be retrieved by movement to the control station.

To initiate the retrieval operation, an operator at the control station actuates a switching mechanism coupled to the solenoid 90 of the desired container 52. Pin 88 will be retracted to permit gravitation of container 52 and its matrix 50 onto platform 210 therebelow, whereupon one of the crossbars 188 will engage matrix 50 and urge it and container 52 longitudinally of beam 128 and upwardly along plate 198. The container and matrix will then gravitate onto platform 204 and then along the latter under the influence of a crossbar 118 until it moves off the upper extremity of plate 106. The container and matrix will then gravitate onto ramp 94 and slide downwardly along the latter and into spiral chute 96. Chute 96 will deliver the container to the control station.

Although only a relatively small number of tiers and range rows have been illustrated and described herein, it is to be understood that system 20 could embrace a relatively large number of tiers and range rows and would be limited only by the space allotted therefor. The components of carrier 28 and matrix 50 which determine the desired tier, may be miniaturized and the dimensions of projections 66 and 72, as well as the sizes of the discontinuities on beams 104 and 128, may be sufficiently small to have any effect on the size limitations of system 20.

When the contents of container 52 have been removed at the control station, the container may be returned to its compartment 86 in the usual manner. If system 20 is to be used for library books, means could be provided to indicate whether or not a container is empty so as to eliminate the time required to await the arrival of the container at the control station. One means of accomplishing this would be to provide a spring switch which would operate a signal at the circulation desk, the switch being actuated by the weight of the empty container and its matrix as distinguished from being deactuated when the container had an article therewithin. Upon observing the signal, the fact that the container is empty would be relayed to the person desiring the book. Hence, it would be unnecessary to wait for the delivery of the container and the book borrower would be free to make other book selections.

The attendant at the circulation desk can readily remove the contents from or insert articles into containers 52 by merely removing closure 56 from the bottom of container 52 and then replacing the closure for movement of the container and its matrix to its respective compartment 86. It is clear that only a single attendant would be required to operate system 20 inasmuch as shelving and retrieval of containers 52 are completely automatic. Thus, a single attendant would be in a position to know what articles have been retrieved or stored, and pilfering of articles, such as library books, would become virtually nonexistent.

System 20 could be housed in a minimum of space because walkways and other similar areas would not be required. Maintenance, therefore, would be kept at a minimum because the region in which system 20 would be disposed would need to be cleaned only at periodic intervals rather than each day as is generally required in present-day libraries. It has been determined that, for a library containing approximately twelve million volumes, there would be an increase in book capacity of approximately ten percent when utilizing system 20 for shelving and retrieving the books. Coupled with the savings which would be realized in minimizing the personnel required to operate and maintain system 20, it is evident that very substantial economies may be practiced by the utilization of system 20.

Sensitized switches, such as the type operated by photocells, may be used for starting and stopping the movements of the various conveyors in response to the presence of a container 52, either entering or leaving their operable areas or is dropped from its respective compartment 86. In this way, those components of system 20 which do not contribute to the handling of a container 52 would remain inoperative until their operation is subsequently required.

Having thus described the invention, what is claimed as new and desired to be secured by Letters Patent is:

1. An article storage and retrieval system comprising:
a storage unit having a plurality of article-receiving spaces and provided with actuatable means for each space respectively to releasably retain an article therein;
a control station spaced vertically and laterally from said storage unit;
an indexing member for each article to be stored and each space respectively, each member being adapted to be coupled to its article for movement therewith;
conveyor means between said storage unit and said control station for moving each member and the article coupled therewith vertically and laterally to said storage unit from said control station;
indexing means on said conveyor means for directing each article moved thereby into a respective space of said storage unit;
means for actuating the retaining means of each space to permit release of the article retained therein;
a collection station spaced from said storage unit; and
means extending between said storage unit and said collection station for directing an article released from said storage unit to said collection station, said conveyor means including an elongated, grooved beam, each indexing member having projection means receivable within a groove of said beam for supporting said member, said indexing means including a discontinuity in said groove for releasing said member from the groove when the member reaches a predetermined location.

2. An article storage system comprising:
a storage unit having a plurality of article-receiving spaces;
a control station spaced from said storage unit;
an indexing member for each article to be stored respectively, each member adapted to be coupled to its article for movement therewith;
conveyor means between said control station and said storage unit for moving each member and the article coupled therewith to said storage unit from said control station; and
indexing means on each member and said conveyor means for directing each article into a respective space of said storage unit said conveyor means including an endless, flexible element having a carrier thereon, said carrier being provided with pin means for coupling an indexing member thereto.

3. An article storage system comprising:
a storage unit having a plurality of article-receiving spaces;
a control station spaced vertically and laterally from said storage unit;
an indexing member for each article to be stored and each space respectively, each member adapted to be coupled to its article for movement therewith;
conveyor means for moving each member and the article coupled therewith vertically into a first position spaced from said control station and said storage unit;
indexing means on said conveyor means and each member for separating the latter from said conveyor means when the member and its article are at said first position;
conveyor structure adjacent to said conveyor means for moving each member and its article laterally from said first position into a second position spaced from said storage unit;
indexing structure on each member and said conveyor structure for separating the member from said conveyor structure when the member and its article are at said second position, said storage unit being disposed to receive said member and its article in a respective space thereof when the member and its article are separated from said conveyor structure said conveyor means including an endless, flexible element having a carrier thereon, said carrier being provided with pin means for coupling an indexing member thereto.

4. An article-storage system as set forth in claim 3, wherein said storage unit is provided with means for each space respectively for releasably retaining the corresponding indexing member therein, and means for directing a member released from said storage unit to a collection area.

5. An article-storage system as set forth in claim 4, wherein said storage unit is provided with a plurality of compartments defining said spaces thereof, each compartment having an open top for receiving the corresponding indexing member and an open bottom for releasing the indexing member, said retaining means normally extending across the bottom of a respective space and movable to a location clearing the same.

6. An article-storage system as set forth in claim 5, wherein said directing means includes a conveyor below said storage unit.

7. An article-storage system as set forth in claim 5, wherein said compartments are aligned in a number of rows, said directing means including a number of conveyors below and in alignment with respective rows of said compartments.

8. An article-storage system as set forth in claim 3, wherein said indexing means includes mechanism for moving the indexing member off said pin means.

9. An article-storage system as set forth in claim 3, wherein said indexing means includes an electrical circuit having solenoid means for forcing an indexing member off said pin means and electrical switching means adjacent to said first position for closing said circuit to thereby energize said solenoid means.

10. An article-storage system as set forth in claim 3, wherein said conveyor structure includes a first horizontal conveyor extending perpendicularly from said conveyor means and a number of second horizontal conveyors disposed in side-by-side relationship and extending perpendicularly from said first conveyor, said storage unit being below and in alignment with said second conveyors, said storage unit being provided with a plurality of open top compartments disposed in a number of rows, there being a second conveyor above and aligned with each row respectively.

11. An article-storage system as set forth in claim 10, wherein each of said first and second conveyors includes a grooved beam and movable crossbbars disposed transversely of the longitudinal axis of a corresponding beam, said indexing member having projection means receivable within a respective groove of each beam and supported thereby, one of said crossbars being engageable with said indexing member for moving the latter along the corresponding beam.

12. An article-storage system as set forth in claim 11, wherein each of said first and second conveyors further includes means for supporting the indexing member from beneath and rotatable screw means for moving said supporting means in a direction to move the projection means of the indexing member into coupled relationship with the respective groove of the corresponding beam.

13. An article-storage system as set forth in claim 11, wherein said indexing structure includes a discontinuity in each of at least certain of the grooves of each beam, the projection means of said indexing member being movable into a respective discontinuity and thereby out of coupled relationship with the respective groove of the corresponding beam.

14. An article-storage and retrieval system comprising:
a number of vertically spaced storage units each having a plurality of article-receiving compartments, each compartment having an open top and an open bottom and provided with means thereon for releasably retaining an article therewithin;
a control station below and spaced laterally from the lowermost storage unit;
an indexing member for each article to be stored and each compartment respectively, each member having means for coupling its article thereto for movement therewith;
a first conveyor movable vertically and having means for elevating an indexing member to any one of a number of first positions corresponding to the storage unit in which the indexing member is to be disposed;
means on said conveyor for separating an indexing member therefrom when the indexing member reaches the corresponding first position;
first indexing means on said first conveyor and each indexing member and coupled with said separating means for actuating the latter when the indexing member is at the corresponding first position;
a second conveyor for each storage unit respectively, each second conveyor being horizontally disposed and extending laterally from said first conveyor;
means between said first conveyor and each second conveyor for directing an indexing member into coupled relationship with the second conveyor after the indexing member has been separated from the first conveyor;
second indexing means on each indexing member and each second conveyor for moving the indexing member out of coupled relationship to said second conveyor;
a number of third, horizontally disposed, laterally extending conveyors for each second conveyor respectively, said third conveyors of each second conveyor being disposed above and in alignment with respective rows of said compartments of the corresponding storage unit, said third conveyors being disposed to support and move corresponding indexing members after the latter have moved out of coupled relationship to the corresponding second conveyor; and
third indexing means on each indexing member and each third conveyor for separating the indexing member from the corresponding third conveyor, each storage unit being disposed to receive an indexing member separated from a corresponding third conveyor in a respective compartment thereof, each storage unit further being disposed above and aligned with the third conveyors corresponding to the next adjacent storage unit therebelow, whereby an indexing member released from a corresponding compartment will be received on the third conveyor aligned therewith and disposed therebelow, each third conveyor being disposed to move an indexing member laterally to a collection area.

References Cited

UNITED STATES PATENTS

| | | | |
|---|---|---|---|
| 636,558 | 11/1899 | Reich | 186—1.2 |
| 1,816,887 | 8/1931 | Adams | 186—1.2 |
| 2,362,079 | 11/1944 | McCann et al. | 214—11 |
| 2,508,086 | 5/1950 | Alvarez. | |
| 2,815,871 | 12/1957 | Ferguson | 214—16 |
| 3,049,247 | 8/1962 | Lemelson | 214—11 X |

ROBERT G. SHERIDAN, *Primary Examiner.*

R. B. JOHNSON, *Assistant Examiner.*